July 9, 1946.　　B. S. CARR ET AL　　2,403,635
CHAIN
Filed March 4, 1943　　2 Sheets-Sheet 1
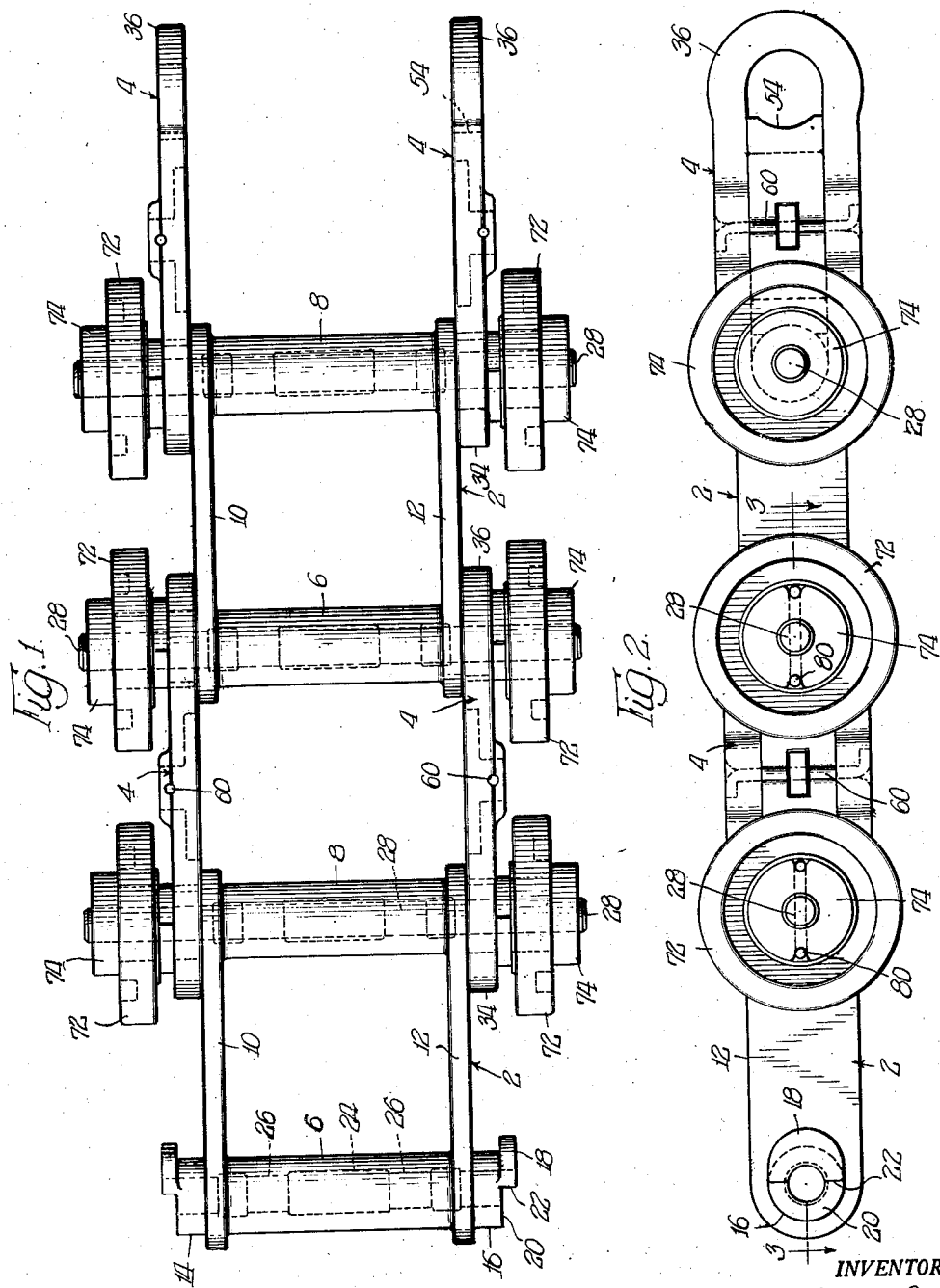
INVENTORS.
Bradley S. Carr,
BY Arthur L. Blakemore,
Wilkinson, Huxley, Byron Knight
Attys.

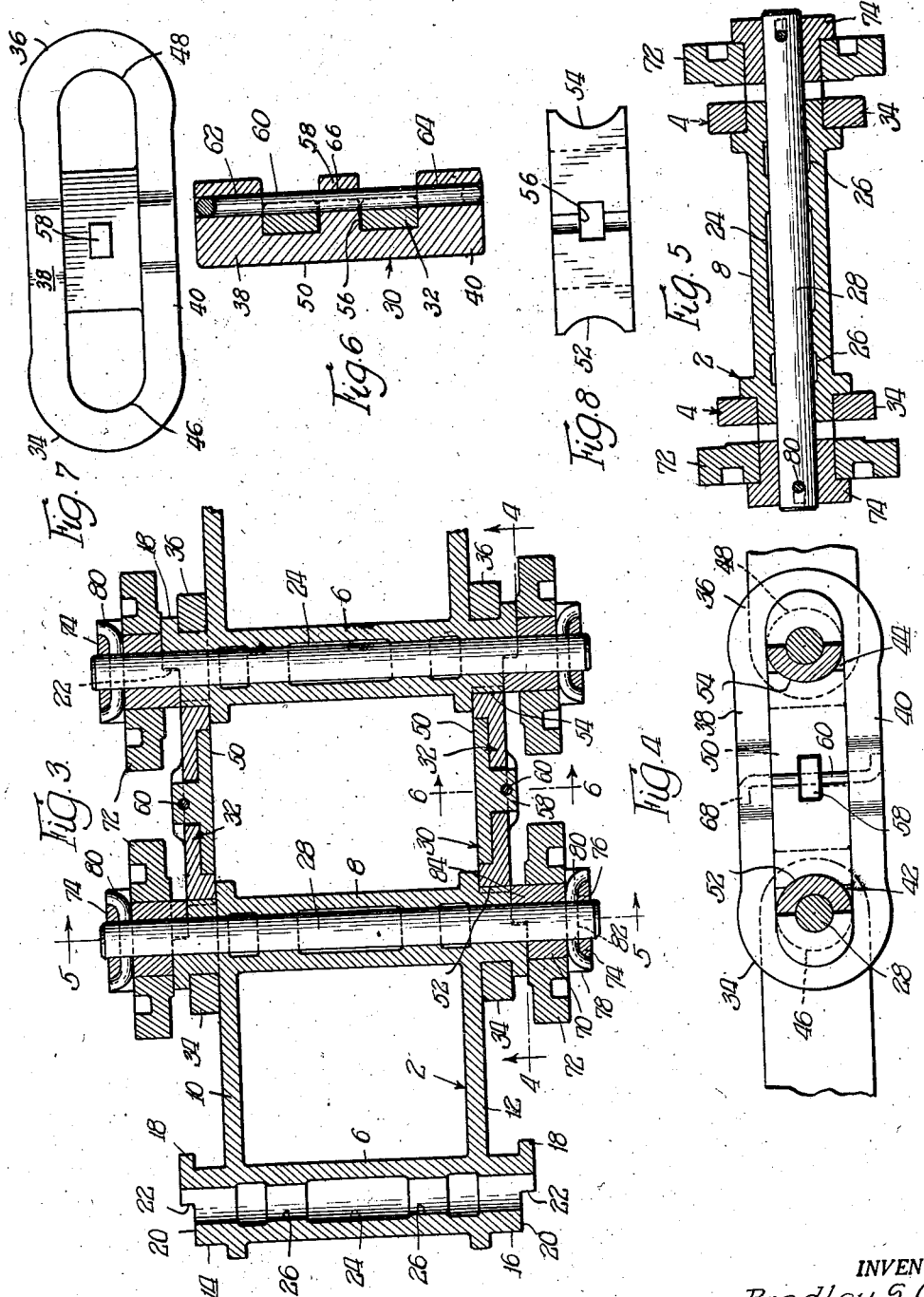

Patented July 9, 1946

2,403,635

UNITED STATES PATENT OFFICE 2,403,635

CHAIN

Bradley S. Carr, Chicago, and Arthur L. Blakemore, Glenwood, Ill., assignors to American Brake Shoe Company, a corporation of Delaware Application March 4, 1943, Serial No. 477,946

15 Claims. (Cl. 74—254)

The present invention relates to chains, and more particularly to novel chain mechanisms for use in conveyors for dredges, pig casting machines, and the like.

Among the objects of the present invention is to provide a novel chain mechanism characterized by its simplicity in design, its ability to withstand hard usage for various types of heavy work, and by its ease of assembly and disassembly.

The present invention involves an improvement in chains of the type disclosed in Patent No. 1,967,496, which includes as elements in the combination, rollers for supporting and guiding the chain during its operation and for transmittal of forces to other parts of the machine or device in which the chain forms a component part.

The present invention is, therefore, grounded upon a desire to provide an improved chain assembly of the type shown in the patent before mentioned, and which is capable of withstanding the stresses and strains to which such a chain mechanism would be subjected in heavy work, such, for example, as would be experienced in dredging mechanisms.

A further object of the present invention is to provide a chain of the type herein identified, in which the transmittal of force between the links is direct, with the rollers serving merely as a medium for taking the weight of the entire chain and transmitting the same to the supports or guides for said chain.

More particularly, the present invention comprehends a chain assembly in which the direct transmittal of forces between the links thereof is effected by interlocking means permitting proper bearing relation between the links, yet being of such a construction as to permit the ready assembly and disassembly of the links for the purpose of replacement or repair. As illustrative of the present invention the said side links may be of multi-part construction in which the parts have bearing relation with the frame links, but which are readily detachably connected together to facilitate the interconnection of these links or disassembly of the same at will.

Another object within the purview of the present invention is to provide a chain assembly of the type herein disclosed, in which the rollers are mounted for operation independent of the side links which serve as connecting elements between the frame links.

More particularly, the invention contemplates a structure in which the rollers are mounted upon separate bushings which, in turn, are mounted upon bearing pins having operative relation with the side and frame links for transmittal of the weight of the chain assembly to the said rollers.

In one embodiment of the invention, operative association of the roller mountings in assembly is effected through a clutch relation between the separate bushings and the link structure for maintaining proper operating relation of the elements of the chain and to provide an assembly in which the bearings may be readily removed for repair or replacement.

Other objects, features, capabilities and advantages are comprehended by the invention, as will later appear and as are inherently possessed thereby.

Referring to the drawings—

Figure 1 is a fragmentary top plan view of a chain made in accordance with the present invention;

Figure 2 is a view in side elevation of the chain mechanism shown in Figure 1 of the drawings;

Figure 3 is a fragmentary view in cross-section taken in the plane represented by line 3—3 of Figure 2 of the drawings;

Figure 4 is a fragmentary view partly in elevation and partly in section, and taken in the plane represented by line 4—4 of Figure 3;

Figure 5 is a view in section taken in the plane represented by line 5—5 of Figure 3;

Figure 6 is a view in section taken in the plane represented by line 6—6 of Figure 3 of the drawings;

Figure 7 is a view in side elevation of one of the side links for the assembly shown in Figures 1–6, inclusive; and Figure 8 is a view in side elevation of the retaining element for the side link shown in Figure 7 of the drawings.

Referring now more in detail to the drawings, an embodiment selected to illustrate the present invention is shown as comprising a series of frame links 2 interconnected by the side links 4, and forming a chain particularly adapted for heavy duty, such for example as would be required in dredges and the like. The frame links 2 are constituted by the spaced transversely arranged hollow frame elements 6 and 8, formed integrally with the longitudinally disposed side elements 10 and 12 to form a rigid frame structure forming the alternate links of the chain assembly.

The hollow frame elements 6 and 8 are of substantially the same formation and involve the end journal bearings 14 and 16, each of which extends laterally of the side frame elements 10 and 12, and each having its end formed in part by the radial half flange 18 and the adjacent axial recess 20 providing a shoulder 22 with the flange 18. The said frame elements 6 and 8 are each provided with a centrally disposed bore 24 having its terminals at the ends of the journal bearings 14 and 16 and which is formed to provide the finished bearing surfaces, such as 26, and the like, and being adapted to receive a retaining pin 28 extending laterally beyond the journal bearings.

The side links 4 are of similar formation, best shown in Figures 3, 4 and 6 and are of multi-part construction including the element 30 and the retaining element 32. The link element 30 is of integral construction having the opposed end portions 34 and 36 interconnected by the side portions 38 and 40, and which element 30 is provided with the openings 42 and 44 adjacent the ends thereof. The said openings are defined in part by the opposed curved bearing surfaces 46 and 48 and in part by the center filler 50 connecting the side portions 38 and 40 together. These openings 42 and 44 are sufficiently large to enable the assembly of the side links with the frame links in the manner particularly disclosed in Figure 3, whereby the bearing surfaces 46 and 48 are in bearing relation to the journal bearings of adjacent frame links. The said end portions 34 and 36 of the link element 30 are disposed axially and inwardly with respect to the radial flanges 18 of the frame links, whereby the side links when in operative relation with respect to the said frame links are held against lateral movement with respect thereto by the radial flanges 18.

The side links are held in operative relation to the frame links through the medium of the retaining element 32 which is formed with the curved bearing surfaces 52 and 54 at its ends, adapted to engage the journal bearings such as 16 of adjacent frame links. This retaining element is formed with the centrally disposed aperture 56 fitting over the lug 58 of the link element 30, the said assembly being retained in operative condition through the medium of the pin 60 passing downwardly through the opposed openings 62 and 64 formed in the side portions 38 and 40 and the aligned opening 66 provided in the lug 58, the said pin being turned or bent as at 68 to prevent displacement thereof during the operation of the chain mechanism.

As previously indicated, the pin 28 extends laterally beyond the journal bearings 14 and 16 and serves as a mounting for the bushings 70 on which the rollers 72 are mounted. These bushings 70 are formed at one end with an enlarged head 74 adapted to retain the rollers 72 in position between the radial flanges 18 and the same, the said enlarged head being further provided with the transverse opening 76 having its terminal ends axially disposed as at 78, and which is adapted to receive a locking pin 80 passing through the aligned opening 82 in the pin 28. The locking pin 80 is bent axially into the axially disposed openings 78 for retaining the bushings in operative relation to the pin 28.

Each of the bushings 70 is provided with a half round projection 84 complementary to the recess 20 of the journal bearings and cooperating therewith to effect clutching relation in the form of a half jaw clutch retaining the bushing in its proper operative relation with respect to the said bearing.

As will be noted, the radial flanges 18 of the adjacent frame journal bearings extend in opposed relation to one another so as to effectively prevent lateral displacement of the side links when the retaining element thereof is disposed in bearing relation to said journal bearings.

It will be further noted that the entire force transmitted between the links of the chain is directly from one link to the other, and is independent of the rollers comprising a part of the completed assembly. The pins 28 of the structure above described merely serve in the assembly to take the weight of the entire chain for transmittal to supporting and guiding elements, and accordingly the rollers mounted upon the bushings 70 are not affected during their operation by the working loads being transmitted between the links of the chain.

In addition to the above desirable characteristics of the present chain assembly, it should be further noted that the rollers are not mounted directly upon the pins 28, but on the other hand are mounted upon bushings 70 which are readily repaired or replaced after the same become worn during operation. This is of particular importance in a chain of the character herein described, by virtue of its large size, which is necessary in dredges and the like, and wherein the pins, such as 28, are of large, massive construction, which are costly and oftentimes hard to replace. In the present assembly there is no wear on the pins 28 from the rotation of the rollers 72, and the present assembly contemplates renewable bushings, such as 70, which are not pressed into any of the link mechanism nor forcibly attached to the pin, whereby the same are readily replaced as desired.

While the drawings illustrate the frame links as being constituted only by the frame elements described, and which construction would appear in certain types of power chains, nevertheless the present invention is of such a scope as to contemplate various types of scraper blades or supports which could be formed as parts of these frame links and as would be used in chain mechanism adapted for dredges and the like. Accordingly, the particular form of frame links herein disclosed has been chosen merely for the purpose of simplifying the present illustration of the invention.

While I have herein described and upon the drawings shown an illustrative embodiment of the invention, it is to be understood that the invention is not limited thereto but may comprehend other constructions, arrangements of parts, details and features without departing from the spirit of the invention.

We claim:

1. A chain comprising adjacently disposed frame links formed with spaced transversely disposed frame elements interconnected by spaced side frame elements, said transversely disposed frame elements extending laterally of said side frame elements and providing journal bearings, and side links having journal relation with said bearings under all operating conditions of said chain for interconnecting said frame links together, means on said journal bearings for holding said side links against lateral displacement with respect to said frame links and to hold said links against relative linear movement with respect to one another, said side links being of multi-part construction having means for assembling and disassembling the same with respect to said frame links.

2. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, means on said journal bearings for holding said side links against lateral displacement with respect to said frame links, said side links being of multi-part construction including a retaining element having journal relation with said bearings to hold said links against relative linear movement with respect to one another, and means for readily detachably connecting the parts of said side links together.

3. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, means on said journal bearings for holding said side links against lateral displacement with respect to said frame links, said side links being of multi-part construction each including a link element adapted to embrace said journal bearings and having opposed surfaces having bearing relation therewith, a retaining element interposed between and having bearing relation with said journal bearings to hold said links against relative linear movement with respect to one another, and means for interconnecting said elements together.

4. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, said journal bearings having radial flanges for holding said side links against lateral displacement with respect to said frame links, said side links being of multi-part construction including a retaining element having journal relation with said bearings to hold said links against relative linear movement with respect to one another, and means for readily detachably connecting the parts of said side links together.

5. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, said journal bearings having radial flanges for holding said side links against lateral displacement with respect to said frame links, said side links being of multi-part construction each including a link element adapted to embrace said journal bearings and having opposed surfaces having bearing relation therewith, a retaining element interposed between and having bearing relation with said journal bearings to hold said links against relative linear movement with respect to one another, and means for interconnecting said elements together.

6. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, means on said journal bearings for holding said side links against lateral displacement with respect to said frame links, said side links being of multi-part construction each including a link element formed with openings adjacent its ends adapted to receive said journal bearings and an intermediate filler member, said openings being formed in part with opposed surfaces adapted to have bearing relation with said journal bearings, a retaining element interposed between and having bearing relation with said journal bearings to hold said links against relative linear movement with respect to one another, and means for connecting said last named element to said filler member.

7. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, said journal bearings having radial flanges for holding said side links against lateral displacement with respect to said frame links, said side links being of multi-part construction each including a link element formed with openings adjacent its ends adapted to receive said journal bearings and an intermediate filler member, said openings being formed in part with opposed surfaces adapted to have bearing relation with said journal bearings, a retaining element interposed between and having bearing relation with said journal bearings to hold said links against relative linear movement with respect to one another, and means for connecting said last named element to said filler member.

8. A chain comprising adjacently disposed frame links formed with spaced transversely disposed frame elements interconnected by spaced side frame elements, said transversely disposed frame elements extending laterally of said side frame elements and providing journal bearings, side links having journal relation with said bearings for interconnecting said frame links together, said journal bearings having radial flanges for holding said side links against lateral displacement with respect to said frame links, said side links being of multi-part construction each including a link element formed with openings adjacent its ends adapted to receive said journal bearings and an intermediate filler member provided with an apertured lug, said openings being formed in part with opposed surfaces adapted to have bearing relation with said journal bearings, a retaining element interposed between and having bearing relation with said journal bearings to hold said links against relative linear movement with respect to one another, said retaining element being provided with an aperture adapted to be received by said apertured lug, and a retaining pin for said last named aperture for interconnecting said elements together.

9. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, means on said journal bearings for holding said side links against lateral displacement with respect to said frame links, a pin received in each of said frame elements extending laterally beyond said journal bearings, bushings mounted on said pin adjacent said journal bearings, rollers mounted on said bushings, and means for securing said assembly in operative relation.

10. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, means on said journal bearings for holding said side links against lateral displacement with respect to said frame links, a pin received in each of said frame elements extending laterally beyond said journal bearings, bushings mounted on said pin adjacent said journal bearings, said bushings and journal bearings having cooperating clutch means, rollers mounted on said bushings, and means for securing said assembly in operative relation.

11. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, said journal bearings having radial flanges for holding said side links against lateral displacement with respect to said frame links, a pin received in each of said frame elements extending laterally beyond said journal bearings, bushings mounted on said pin adjacent said journal bearings, said bushings and journal bearings having cooperating clutch means, rollers mounted on said bushings, and means for securing said assembly in operative relation.

12. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, each of said journal bearings at its end being formed with a radial flange for holding said side links against lateral displacement with respect to said frame links and an adjacent recessed portion, a pin received in each of said frame elements extending laterally beyond said journal bearings, bushings mounted on said pin adjacent said journal bearings, said bushings having projections received in said recessed portions, rollers mounted on said bushings, and means for securing said assembly in operative relation.

13. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, means on said journal bearings for holding said side links against lateral displacement with respect to said frame links, said side links being of multi-part construction including a retaining element having journal relation with said bearings, means for detachably connecting the parts of said side links together, a pin received in each of said frame elements extending laterally beyond said journal bearings, bushings mounted on said pin adjacent said journal bearings, rollers mounted on said bushings, and means for securing said assembly in operative relation.

14. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, means on said journal bearings for holding said side links against lateral displacement with respect to said frame links, said side links being of multi-part construction including a retaining element having journal relation with said bearings, means for detachably connecting the parts of said side links together, a pin received in each of said frame elements extending laterally beyond said journal bearings, bushings mounted on said pin adjacent said journal bearings, said bushings and journal bearings having cooperating clutch means, rollers mounted on said bushings, and means for securing said assembly in operative relation.

15. A chain comprising adjacently disposed frame links formed with spaced transversely disposed hollow frame elements interconnected by spaced side frame elements, said transversely disposed frame elements extending laterally of said side frame elements and providing journal bearings, side links mounted upon and having journal relation with said bearings for interconnecting said frame links together, each of said journal bearings at its end being formed with a radial flange for holding said side links against lateral displacement with respect to said frame links and an adjacent recessed portion, said side links being of multi-part construction including a retaining element having journal relation with said bearings, means for detachably connecting the parts of said side links together, a pin received in each of said frame elements extending laterally beyond said journal bearings, bushings mounted on said pin adjacent said journal bearings, said bushings having projections received in said recessed portions, rollers mounted on said bushings, and means for securing said assembly in operative relation.

BRADLEY S. CARR.
ARTHUR L. BLAKEMORE.